Jan. 29, 1963 H. J. HALL 3,075,365
DEVICE FOR FREEZING AND RELEASING ICE CUBES
Filed May 9, 1962

INVENTOR.
HENRY J. HALL
BY Edward M. Apple
ATTORNEY

United States Patent Office 3,075,365
Patented Jan. 29, 1963

3,075,365
DEVICE FOR FREEZING AND RELEASING ICE CUBES
Henry J. Hall, 18912 Mapleview, Detroit, Mich.
Filed May 9, 1962, Ser. No. 193,460
6 Claims. (Cl. 62—355)

This invention relates to refrigeration and has particular reference to a device for and method of changing a liquid to a solid. It has wide application in the freezing and release of ice cubes, coated ice cream bars and the like.

An object of the invention is to provide means and a method for automatically freezing and releasing ice cubes and blocks, or coated confections, such as ice cream and ice cicle bars.

Another object of the invention is to provide a means and method which may be employed with small domestic refrigerators or expanded to large commercial operations for food processing or other uses.

A further object of the invention is to provide a means and method, which permits a continuous cycle of freezing and releasing of ice cubes.

A further object of the invention is to provide a means and method, which utilizes a recharge of liquid, through heat exchange, to cause the release of a solid frozen from a previous charge of liquid.

Another object of the invention is to provide a highly heat conductive, reversible receptacle which is constructed with oppositely disposed segmented compartments, constructed and arranged so that the walls of the respective segments are of substantially equal proportion and heat conductive ability.

A further object of the invention is to provide a reversible receptacle of the character indicated above, which may be supported on the interior of a refrigerated space, and be provided with a liquid intake source, and arranged so that upon reversing the receptacle and recharging it with a fresh supply of liquid on its reverse side, the contents of the receptacle previously frozen will be discharged from the receptacle.

The foregoing and other objects and the advantages of the invention will become more apparent as the description proceeds, reference being made from time to time to the accompanying drawing, forming part of the within disclosure, in which drawing.

Figure 3:
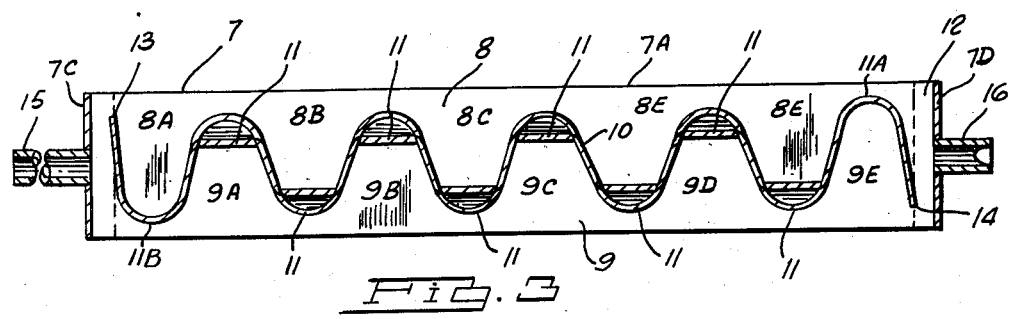
FIG. 3 is a section taken substantially on the line 3—3 of FIG. 2.
Figure 4:
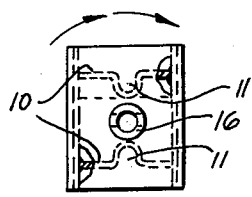
FIG. 4 is a section taken substantially on the line 4—4 of FIG. 1.

Referring now more particularly to the drawings, it will be understood that in the embodiment herein disclosed the reference character 7, in general, indicates the reversible receptacle comprising the principal part of the invention, which is more specifically described hereinafter. The receptacle 7 is preferably made of some high heat conductive metal, and in the embodiment herein disclosed is rectangular in shape and consists of side walls 7A and 7B, and end walls 7C and 7D. The receptacle 7 is divided into top and bottom compartments 8 and 9 (FIG. 3), by means of an undulating wall 10, which undulating wall 10 also divides each compartment 8 and 9 into an equal number of spaces 8A, 8B, 8C, 8D and 8E and 9A, 9B, 9C, 9D and 9E (FIG. 3). Each end undulation 11A and 11B is without a groove, and is slightly higher than the remainder of the undulations.

The height of the undulation 11A determines the water level, when the device is in the position shown in FIG. 3, and the height of the undulation 11B determines the water level when the device is inverted from FIG. 3. A groove 11 is formed in each undulation and communicates each space 8A and 8B, etc. with each adjacent space, on each respective side of the wall 10, so that a liquid level may be maintained in the compartment 8 and each of its spaces when the receptacle is positioned as shown in FIG. 3, and so that a corresponding liquid level may be maintained in the compartment 9 and its spaces 9A, etc. when the receptacle is reversed from the position shown in FIG. 3.

A space 12 is provided at each end of the receptacle 7 so that excess liquid may be drained from the receptacle, in order that the liquid level in the receptacle 7 can always be maintained at the point 13, when the device is positioned as shown in FIG. 3, and at the point 14 when the receptacle is reversed from FIG. 3.

Figure 1:
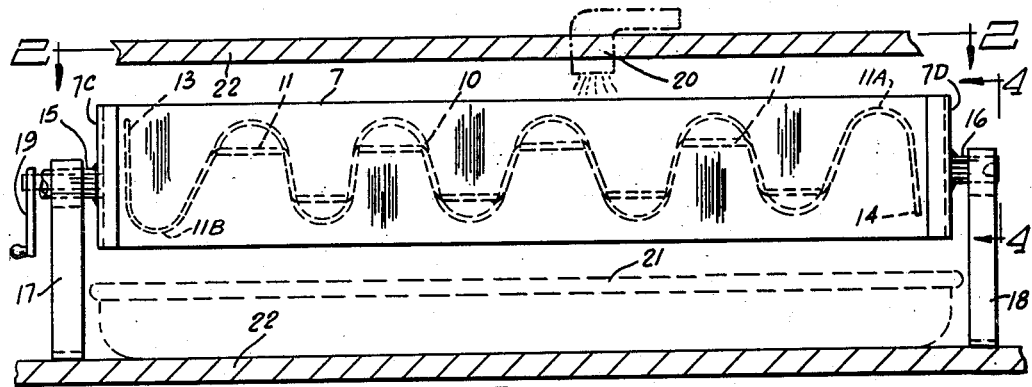
FIG. 1 is a side elevational view, with parts in section, of a device embodying the invention.
Figure 2:
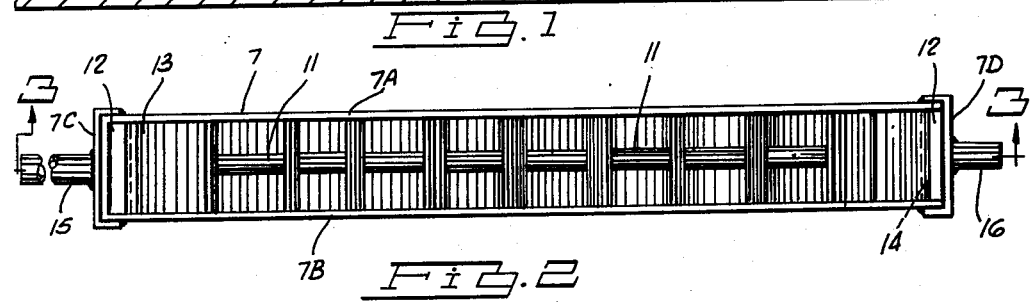
FIG. 2 is a top plan view of the reversible receptacle shown in FIG. 1, removed from its environment in FIG. 1.

I prefer to rotate and support the receptacle 7 on trunnions 15 and 16 which are held in support brackets 17 and 17 (FIG. 1). The device may be manually rotated by means of a hand crank 19, although I contemplate the automatic rotation of the receptacle 7 by power means also.

A liquid supply source is shown at 20, and a receptacle 21 is provided below the receptacle 7 to catch liquid overflow from the receptacle 7 and to catch the solids which are frozen in the receptacle 7 and released, as hereinafter described.

I prefer to house the elements hereinabove described in a refrigerated enclosure, the walls of which are indicated by means of the reference character 22.

Although I have described a typical receptacle 7, it will be understood I intend to make the receptacle in various shapes and sizes, all of which is within the contemplation of the invention. It is also within the contemplation of the invention to support the receptacle 7 for rotation on a single trunnion at one end, if such a structure seems advantageous in any application.

In practicing my invention, I first mount the receptacle 7 on the interior of a refrigerated compartment, as shown in FIG. 1, and admit liquid to the receptacle 7 by means of the liquid inlet 20. The liquid level in the receptacle 7 will reach the point 13 when the receptacle is in the position as shown in FIGS. 1 and 3 and any surplus liquid will overflow into the receptacle 21. The receptacle 7 remains in the position shown in FIG. 1, until the liquid is solidly frozen. The receptacle is then rotated by means of the hand crank 19, so that the frozen liquid is then in the bottom compartment of the receptacle. A new charge of liquid is then admitted to the receptacle in the reversed position, so that the liquid will be on the opposite side of the wall 10 from the solid previously frozen from the first charge of liquid. The new charge of liquid, because of its higher temperature than the temperature of the solid, will cause a heat exchange between the wall 10 and the side walls of the receptacle 7, which heat exchange will cause the frozen solids in the bottom compartment of the receptacle to fall into the container 21. Thus, it will be seen that alternately charging and freezing the separate compartments of the receptacle 7, I can freeze and release ice cubes or other forms of solid in a continuous manner.

It is believed that the operation of the invention is obvious from the foregoing description.

Having described my invention, what I claim and desire to secure by Letters Patent is:

1. An ice cube tray comprising, a reversible, highly heat conductive receptacle having a pair of straight ends walls, and a pair of straight side walls defining upper and lower compartments, said compartments being separated by a common, integrated undulating wall, apices of the undulations being lower than said end and side walls.

2. The structure of claim 1, in which each compartment is divided into a plurality of sub-compartments, by said undulating wall, with means for maintaining a common liquid level in the sub-compartments of each compartment.

3. The structure of claim 1, in which each compartment is divided into a plurality of sub-compartments, by said undulating wall, with means for maintaining a common liquid level in the sub-compartments of each compartment, said last named means comprising a groove in each undulation of said wall.

4. The structure of claim 1, in which each compartment of said receptacle is provided with an overflow space.

5. The structure of claim 1, including an intermittent liquid supply for said receptacle, and means to freeze the liquid in said receptacle.

6. The structure of claim 1, in which the end undulations of said wall are higher than the remainder of such undulations.

References Cited in the file of this patent

UNITED STATES PATENTS

| | | |
|---|---|---|
| Re. 18,685 | Hull | Dec. 6, 1932 |
| 1,738,162 | Weeks | Dec. 3, 1929 |
| 2,028,047 | Cole | Jan. 14, 1936 |
| 2,221,847 | Rodgers | Nov. 19, 1940 |
| 2,407,058 | Clum | Sept. 3, 1946 |
| 2,771,749 | Miller | Nov. 27, 1956 |
| 2,967,406 | Buzicky | Jan. 10, 1961 |
| 2,968,168 | Lippincott | Jan. 17, 1961 |